Patented July 29, 1941

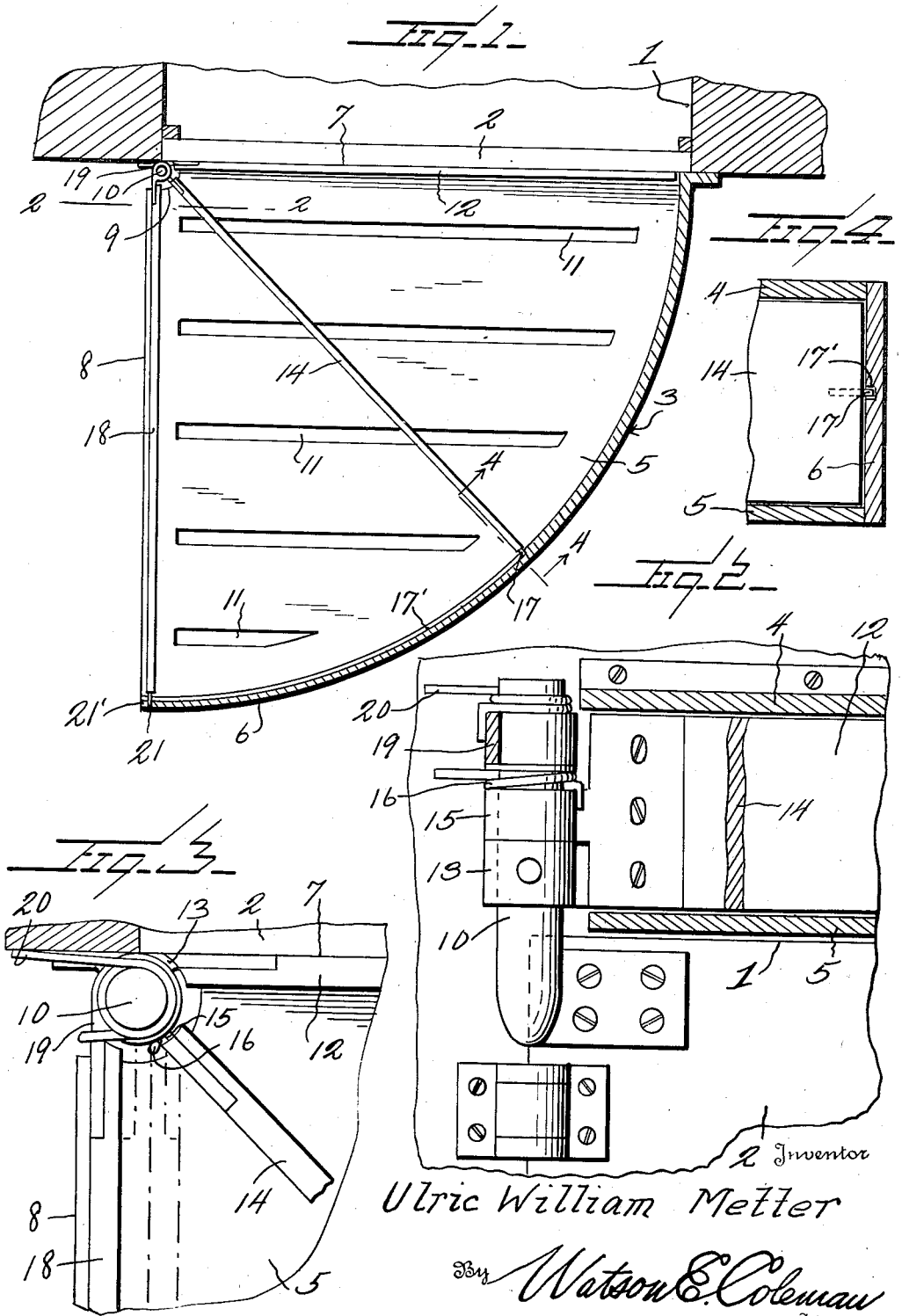

2,250,894

UNITED STATES PATENT OFFICE 2,250,894

FLY TRAP AND KILLER

Ulric William Metter, Oxnard, Calif.

Application March 12, 1941, Serial No. 383,019

7 Claims. (Cl. 43—110)

This invention relates to insect traps and killers and pertains particularly to a novel and improved fly trap and killer to be used in conjunction with doors, particularly screen doors.

The primary object of the present invention is to provide a novel type of fly trap which is designed to be disposed over the top of a screen door to catch flies which commonly collect upon the outer side of a screen door and which rise or fly upwardly as the door is opened.

Another object of the invention is to provide a trap of the character stated, which is designed not only to catch flies but to kill those trapped each time the door adjacent which the trap is mounted is swung to open position.

Another and more specific object of the invention is to provide in association with the top of a screen door, a fly trap comprising a casing having entrance openings and movable bodies within the trap which are connected with the underlying door and which function when the door is opened, to mash and kill the flies caught in the trap.

A further and still more specific object of the invention is to provide a fly trap and killer, comprising a relatively flat housing in the form of a segment of a disk which is designed to be secured above a door and which has a plurality of paddles therein which are adapted to be swung into side by side relation upon the opening of the adjacent door through connection of one of the paddles with the door whereby to kill any flies which have entered the housing through bottom inlet openings, by crushing them between the paddles.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

In the drawing:

Fig. 1 is a horizontal sectional view through the device showing the same applied over a wall opening.

Fig. 2 is a sectional view on the line 2—2 of Fig. 1.

Fig. 3 is a view in top plan on an enlarged scale of the connected inner ends of the paddles and showing the same in broken lines in contacting relation.

Fig. 4 is a sectional view on the line 4—4 of Fig. 1.

Referring more particularly to the drawing, the numeral 1 designates a door opening in the outer side of which is mounted a screen door 2 in the usual manner.

The device embodying the present invention is mounted directly over the screen door upon the outer side thereof. This device comprises a substantially quarter-circular housing which is indicated generally by the numeral 3 and which includes the top and bottom segmental walls 4 and 5, respectively, and a quarter-circular or arcuate vertical or outer edge wall 6 which joins the arcuate edges of the top and bottom walls, as shown. The radius of the housing 3 is substantially equal to the width of the door over which the device is mounted and the housing is secured in position so that one straight side, here indicated by the numeral 7, extends across the top of and parallel with the outer side of the screen door while the other straight side indicated by the numeral 8 extends straight outwardly from the adjacent wall, thus placing the point of the angle between the convergent walls 7 and 8 at one side of the door opening. At this point of the housing, the top and bottom walls are cut out or recessed as indicated at 9, to receive a hinge post 10 which is secured to the screen door coaxially with the axis of the hinges, not shown, for the door. This post extends throughout the height of the housing 3.

The bottom wall 5 of the housing is provided with a plurality of entrance openings 11, for the insects, such openings here being shown as being in the form of slots extending parallel with the straight side 7 of the housing, but it will, of course, be readily understood that any other design of entrance opening may be employed.

Extending along the side 7 of the housing is a paddle 12 which has a length only slightly less than the radius of the inside of the housing, this paddle being of solid or imperforate form so as to function, when the screen door is closed, to close the adjacent side of the housing, it being understood that the height of the paddle is only slightly less than the interior height of the housing. This paddle at its inner end is connected by a hinge collar 13 or in any other suitable manner, with the hinge post 10, so that when the screen door is swung open and the hinge post is turned, the paddle will swing with the door and move from the inner side of the housing through the latter, the extent of such movement being only determined by the extent to which the door is opened.

Within the housing is a second or intermediate paddle 14 which at its inner end is likewise connected with the hinge post 10 by a collar 15, but the collar 15 is free to turn on the post 10 so that the turning of the post does not effect any movement directly of the intermediate paddle 14, but movement of this paddle is brought about through contact of the paddle 12 therewith. A suitable spring means, such, for example, as is shown in Fig. 2 and indicated by the numeral 16, constantly urges the intermediate paddle to swing toward the inner paddle 12, but such movement is limited by suitable stop means which, as here shown, might be in the form of a pin 17 carried by the paddle 14 and moving in a guide slot 17' formed in the inner face of the wall 6 from substantially midway of the ends thereof to the outer end, so that this paddle is normally maintained midway between the two straight sides 7 and 8 of the housing.

The outer straight side of the housing which is designated 8, is closed by an outer paddle 18 which at its inner end is coupled with the pivot post or hinge post 10 by a hinge collar 19 which is free to turn on the post 10. This paddle is controlled by a spring means 20 which normally urges it to move or swing in the direction of the intermediate paddle 14, but such movement is limited by a suitable stop, here shown as being in the form of a pin 21 secured to the paddle and engaging in a notch 21' in the end of the wall 6, as shown. The height of the outer paddle 18 is only slightly less than the inside height of the housing and functions to close the straight outer side thereof. This outer paddle is of solid imperforate form like the other paddles.

In the operation of the present device, the flies will enter the housing through the slots 11, particularly when the door 2 is opened, as it seems to be natural for such insects to fly upwardly. After they have entered the housing and the door is opened, the paddle 12 will swing through the housing, as the door swings, and move into contact with the paddle 14 and will kill any flies trapped between the two paddles. Further opening movement of the door will move the two paddles 12 and 14 together toward the outer paddle 18 so that any flies trapped between the paddles 14 and 18 will thus be killed. If the door is swung through more than an arc of 90° then the outer paddle will be moved against the tension of its control spring 20, with the other two paddles. As the door is swung to closed position, the spring 20 will return the paddle 18 to its normal position in the outerside of the housing and the spring 16 will return the intermediate paddle 14 to its normal intermediate position in the housing while the inner paddle 12 will be carried back through the return rotation of the post 10 with the door 2, to its closing position at the inner side of the housing.

The device herein disclosed has been illustrated and described as a trapping and killing means for flies, but it will be readily apparent that in addition to these functions, it will operate to prevent flies entering the door opening over which it is placed. It is well known that when flies collect upon a screen door, they usually fly upward and over the top of the door as the latter is opened and in this way pass through the door opening, but with the present trap device located above the door opening and in close proximity to the top edge of the screen door, they will be prevented from doing this, and will in the majority of instances be compelled to fly through the openings in the bottom of the trap and thus be trapped and killed.

What is claimed is:

1. An insect trap and killer for actuation by a door, comprising a housing body having top and bottom walls, one wall being provided with inlet openings, a paddle member pivotally supported at one end in one side of the housing for swinging movement through the housing from the said one side toward and into engagement with an opposite side whereby to trap insects and crush the same between the paddle and the said opposite side of the housing, and means for coupling the said pivoted end of the paddle with the door to effect movement of the paddle through the housing on swinging of the door in one direction.

2. An insect trap and killer for actuation by a door, comprising a housing having a wall being provided with inlet openings, top and bottom walls, one pair of relatively movable members disposed within the housing, said members being normally arranged in spaced relation and having a height substantially equal to the interior height of the housing whereby each member functions as a vertical partitioning element, and means for coupling the members with said door for effecting the movement of one of said members through the housing relative to the other member and into contact therewith upon movement of the door in one direction for the crushing of insects between the members.

3. An insect trap and killer for actuation by a door, comprising a relatively flat housing having top and bottom walls, each forming a section of a disk, an arcuate edge wall connecting the arcuate edges of the top and bottom walls, and inner and outer sides converging toward the radial centers of the top and bottom walls, a pair of flat bodies disposed within the housing and extending radially thereof, each of said bodies having a height substantially equaling the interior height of the housing, one of said walls having insect entrance openings therethrough, and means for coupling said bodies adjacent said radial centers to said door supporting said bodies for relative movement in the housing, for the swinging of one of the members on an axis located adjacent the said radial center toward the other member for the crushing of insects between the members on movement of the door in one direction.

4. The combination with an entrance opening having a hinged door therein, of an insect trap and killer, comprising a relatively flat horizontally disposed housing defining a segment of a circle and secured directly above said opening with its radial center substantially coaxial with the axis of rotation of the underlying door, a body disposed within and extending radially through the housing and forming a vertical partition therein, a second body forming a wall of the housing and extending radially thereof and disposed in the vertical plane of the door, means coupling the second body with the door for coaxial swinging movement with the door relative to the first body, and insect admission means for the housing.

5. The combination with a door opening having a hingedly mounted door therein, of an insect trap and killer, comprising a relatively flat housing of partly-circular form secured horizontally over said opening with its radial center disposed above the axis of turning for the door, a member secured to the door and extending upwardly substantially through the radial center of the housing to be rotated by and coaxially with the door, a paddle carried by said member and extending radially within the housing to be swung therethrough upon turning of the member, and means forming a radially extending partition in the housing spaced from said paddle and into contact with one side face of which the paddle moves upon the opening of the door to a predetermined extent, said housing having an insect admission opening through a wall thereof.

6. The combination with a door opening having a hingedly mounted door therein, of an insect trap and killer, comprising a relatively flat housing of partly-circular form secured horizontally over said opening with its radial center disposed above the axis of turning for the door, a member secured to the door and extending upwardly substantially through the radial center of the housing to be rotated by and coaxially with the door, a paddle carried by said member and extending radially within the housing to be swung therethrough upon turning of the member, a second paddle coupled at one end to said member for free swinging movement about the same as a center and extending radially through the housing to form an abutment wall against which the first paddle engages upon opening of the door to a predetermined extent, spring means normally urging movement of the second paddle toward the first paddle, means limiting movement of the second paddle toward the first paddle whereby the paddles are maintained in spaced relation when the door is closed, and means providing an insect entrance leading into the area between the paddles.

7. A fly trap and killer in combination with a wall opening and a pivoted closure member for said opening, comprising a substantially flat housing formed to define a portion of a circle and secured to the wall above said opening with its radial center substantially coaxial with the axis of swinging of the closure, a vertical member carried by the closure to turn therewith upon said axis, a paddle secured at one end to the vertical member and extending radially through the housing in the plane of the closure, the paddle being moved through the housing by and upon the turning of the vertical member with the closure, a second paddle extending radially through the housing and having an end coupled with said member for free swinging about the same as an axis, a third paddle connected at one end with said member and extending radially through the housing and swinging about the said member, said paddles being normally disposed in spaced relation, resilient means normally urging said paddles to move toward the first-mentioned paddle in opposition to the means maintaining the paddles in spaced relation, and means for admitting insects into the housing between the spaced paddles, the said first paddle upon opening of the closure to a predetermined extent being swung into contact with the second paddle and upon further opening of the closure forcing the second paddle into contact with the third paddle.

ULRIC WILLIAM METTER.